(12) United States Patent
Sugita

(10) Patent No.: US 9,151,371 B2
(45) Date of Patent: Oct. 6, 2015

(54) BALL SCREW DEVICE HAVING TUNNEL RACEWAY

(75) Inventor: Sentarou Sugita, Aichi (JP)

(73) Assignee: ABOM CO., LTD., Aichi (JP)

( * ) Notice: Subject to any disclaimer, the term of this patent is extended or adjusted under 35 U.S.C. 154(b) by 0 days.

(21) Appl. No.: 12/530,882

(22) PCT Filed: Sep. 5, 2007

(86) PCT No.: PCT/JP2007/067260
§ 371 (c)(1),
(2), (4) Date: Sep. 11, 2009

(87) PCT Pub. No.: WO2008/129692
PCT Pub. Date: Oct. 30, 2008

(65) Prior Publication Data
US 2010/0132494 A1 Jun. 3, 2010

(30) Foreign Application Priority Data

Mar. 12, 2007 (JP) ................................. 2007-062020
Jun. 11, 2007 (JP) ................................. 2007-153892

(51) Int. Cl.
*F16H 25/22* (2006.01)
(52) U.S. Cl.
CPC ........ *F16H 25/2223* (2013.01); *F16H 25/2214* (2013.01); *Y10T 29/49* (2015.01); *Y10T 74/19767* (2015.01); *Y10T 74/19772* (2015.01)
(58) Field of Classification Search
CPC ................. Y10T 74/19749; Y10T 74/19767; Y10T 74/19772; F16H 25/2214; F16H 25/2223; F16H 25/2219
USPC ................. 74/424.71, 424.75, 424.1–424.84, 74/424.87, 424.81–424.84, 424.879
See application file for complete search history.

(56) References Cited

U.S. PATENT DOCUMENTS

| 1,565,805 | A | * | 12/1925 | Jones | ................................ 254/98 |
| 1,704,031 | A | * | 3/1929 | Boehm | ........................ 74/424.82 |
| 2,298,011 | A | * | 10/1942 | Hoffar | ........................ 74/424.87 |
| 2,478,510 | A | * | 8/1949 | Stolpe | ........................ 74/424.75 |
| 2,502,066 | A | * | 3/1950 | Tanner | ........................ 74/424.75 |
| 3,512,426 | A | * | 5/1970 | Dabringhaus | ............... 74/424.87 |
| 3,580,098 | A | * | 5/1971 | Goad | ........................ 74/424.87 |

(Continued)

FOREIGN PATENT DOCUMENTS

| FR | 335.241 | 10/1905 |
| JP | 10-274309 | 10/1998 |

(Continued)

*Primary Examiner* — William Kelleher
*Assistant Examiner* — Emily Cheng
(74) *Attorney, Agent, or Firm* — Clark & Brody

(57) ABSTRACT

A ball screw device of a screw axis with a helical groove on its outer circumference for balls to circulate thereon includes a nut with a helical groove on its inner circumference for balls to circulate thereon, a number of balls to circulate in an orbit along the helical groove of the screw axis and the helical groove of the nut, and a tunnel raceway for the balls to circulate unlimitedly. The device has a through-hole formed within the wall of the nut for the balls to circulate from one end of the helical groove to the other end, the through-hole having a guidepath on either end of the helical groove to feed the balls into the tunnel raceway. Means are provided between the helical groove on one end face of the nut and the helical groove on the screw axis to prevent the balls from exiting either helical groove.

2 Claims, 12 Drawing Sheets

(56) References Cited

U.S. PATENT DOCUMENTS

| | | | | |
|---|---|---|---|---|
| 3,661,030 A | * | 5/1972 | Gagne | 74/424.83 |
| 4,074,585 A | * | 2/1978 | Richaud et al. | 74/424.87 |
| 4,286,793 A | * | 9/1981 | Ploss et al. | 277/354 |
| 4,357,838 A | * | 11/1982 | Blaurock et al. | 74/424.87 |
| 4,864,883 A | * | 9/1989 | Mayfield | 74/424.87 |
| 5,664,459 A | * | 9/1997 | Muhleck et al. | 74/424.87 |
| 5,832,776 A | * | 11/1998 | Kuo | 74/89 |
| 6,282,972 B2 | * | 9/2001 | Kuramochi et al. | 74/459.5 |
| 6,880,676 B2 | * | 4/2005 | Tsukada et al. | 184/5 |
| 6,941,831 B2 | * | 9/2005 | Ohkubo | 74/424.87 |
| 7,992,461 B2 | * | 8/2011 | Lin et al. | 74/424.86 |
| 8,051,736 B2 | * | 11/2011 | Chen et al. | 74/424.86 |
| 2006/0230856 A1 | * | 10/2006 | Okita et al. | 74/424.88 |
| 2007/0240532 A1 | * | 10/2007 | Osterlanger et al. | 74/424.87 |
| 2007/0295132 A1 | * | 12/2007 | Lin et al. | 74/424.86 |
| 2008/0190230 A1 | * | 8/2008 | Liao et al. | 74/424.83 |
| 2011/0167940 A1 | * | 7/2011 | Shavrnoch et al. | 74/89.36 |
| 2011/0296939 A1 | * | 12/2011 | Kaneko et al. | 74/424.87 |

FOREIGN PATENT DOCUMENTS

| | | |
|---|---|---|
| JP | 11-270648 | 10/1999 |
| JP | 2003-148584 | 5/2003 |
| JP | 2007-24229 | 2/2007 |
| JP | 2007-40469 | 2/2007 |

* cited by examiner

BALL SCREW DEVICE HAVING TUNNEL RACEWAY

FIELD OF INVENTION

This application claims priority based on Japanese Patent Application No. JP2007-62020, filed on Mar. 12, 2007, entitled "Ball Screw Device Having A Circuit, and Method for Manufacturing the Same."

TECHNICAL BACKGROUND

Normally, in the case where an electric motor is used to generate motive energy for translational movement, a ball screw device (including a screw drive transmission device) is used to change the rotary movement of the electric motor to one of translational movement.

The example of the ball screw device is a structure comprising a screw axis, with the outer circumference being a helical-shaped groove (hereinafter referred to as "helical groove") in which for the balls of the device can roll and move, with a nut having a helical groove on the inner circumference screwed onto the screw axis, thus allowing the balls to roll and move in an aligned orbit formed by the groove of the screw axis and not opposed to each other, thus forming a circuit running from one end of the groove to the other end, to allow the balls to circulate unlimitedly.

Prior arts comprising the same type of circuit as this invention are disclosed in Reference Document 1 (Japanese Published Unexamined Application No. H11-270648), referred to below.

As shown in FIG. 1 of Reference Document 1, the ball screw device is a structure having grooves (2a) (3a) spirally formed on a shaft screw (2) and a nut screw (3), respectively, to allow the balls (4) to roll and move. As a ball (4) moves along the groove (3a), the ball (4) is lead to a return groove (5a) within the deflector (5) fixed in the deflector mounting window (3c) and rises through the groove (3a) in an axis direction to allow the balls to circulate (4) unlimitedly.

As shown in FIGS. 3 to 6 of Reference Document 2 (Japanese Published Unexamined Application No. 2007-24229), which is an improved version of the invention of Reference Document 1, an orbit (26) is formed by a helical groove (23) provided on the outer surface of a screw (22) and by a helical groove (24) provided on the inner surface of a nut (25), thus allowing the nut (25) to rotate and move, and forming a circuit (28) congruent with the orbit (26). The circuit (28) is a structure consisting of a tunnel raceway (29) extending from one end (24a) of the groove (24) to the other end. (24b) of the groove (24) within the inner wall of the nut (25). Guiding points (31a) and (31b), respectively, are provided on either end of the tunnel raceway (29).

The invention of Reference Document 2 comprising the aforementioned structure, resolves the following problems that the invention of Reference Document 1 ever has: that an error, or machining error will occur in the engaging (mounting and releasing) structures of the deflector (5) and the discrete component part, i.e. the window portion (3a) and between the return groove (5a) and the screw groove (3a), thus requiring alteration or reprocessing: that the number of component parts will increase, and the time consumed and the cost for maintenance will increase due to further manufacturing and maintenance control, such as further assembling, alteration, and reprocessing or the like.

Reference 1: Japanese Published Unexamined Application No. H11-270648, Paragraph Nos. 0025 to 0029 & FIG. 2)

Reference 2: Japanese Published Unexamined Application No. 2007-24229, Paragraph Nos. 0023 to 0025 & FIGS. 2 to 6)

DISCLOSURE OF INVENTION

Problems to be Resolved by the Invention

Reference 2 has a feature showing how to avoid the problems regarding the conventional structure in the invention of Reference 1. After conducting tests or the like, however, it was found that the invention of Reference 2 still has some points to be improved. An example is disclosed, here. As for providing a tunnel raceway (29) to connect both ends of the helical groove (24) of the nut (25), it is necessary to use a tool of a smaller width than that of the oblong-shaped window groove (35) provided to prevent the balls from exiting the raceway (29). To insert such a thin tool into the raceway, a small light-weight device is required. Using such a tool having an outer diameter less than that of the ball (27) makes the procedure difficult. Moreover, such a tool is not durable, is time consuming to use, and costly to manufacture or the like. Furthermore, pressure is formed when inserting such a thin tool into the raceway, in which case it is necessary to enlarge the tunnel raceway (29) and/or the diameter of the balls (27). Thus, the entire ball screw device may possibly need to be enlarged and an improvement required.

In light of the above-referenced problems, this invention has the following features.

(1) Based on the cross-sectional view of the 180 degree baseline, showing both the helical groove of the nut and the screw axis, this invention provides a simple and basic structure to prevent the balls from exiting the tunnel raceway by the two-point support of one side of the helical groove and the one-point support of the other side of the helical groove, so that the number of component parts is reduced (i.e. large-sized deflectors for a guidepath or the like), thus providing a small-sized ball screw device.

(2) The aforementioned small-sized ball screw device is provided. Thus, a light-weight, small, electrically-operated linear motion device is provided.

(3) By making this ball screw device small and light-weight, the difficulty in manufacturing it is overcome. The device is durable, and the time and cost in manufacturing it is saved.

(4) Even after making the balls and/or the device smaller and light-weight, the load bearing property and/or rotation property of the balls is improved (the rotation property being made smoother), and its steering quality assuredly obtained. Fuel consumption is improved, which makes for efficient environmental sustainability.

(5) Abnormal noise from the nut and the through-hole and/or from the nut and the guidepath is mostly eliminated.

(6) To provide a through-hole and its guidepath which penetrates the ball helical groove to the inner circumference of the nut, the first tool is inserted into the half-round helical groove provided on the inner circumference of the nut, or into a hole of a diameter larger than that of the balls, so as to provide a method for manufacturing the ball screw device in which most of the through-hole is properly formed on the inner wall of the nut.

(7) The number of component parts is reduced, and a simple method for manufacturing the small-sized ball screw device is provided.

Means of Solving the Problems

The first aspect of this invention covers the aforementioned features (1) to (5).

The first aspect of this invention refers to a ball screw device of a screw axis with a helical groove on its outer circumference for balls to circulate thereon, a nut with a helical groove on its inner circumference for balls to circulate thereon, a number of balls to circulate in an orbit along the helical groove of the screw axis and the opposing helical groove of the nut, and a tunnel raceway (for the balls to circulate unlimitedly) characterized in comprising a through-hole formed within the wall of the nut for the balls to circulate from one end of the helical groove of the nut to the other end, with the through-hole having a guidepath on either end of the helical groove to feed the balls into the tunnel raceway, and a means provided between the helical groove on one end face of the nut and the helical groove on the screw axis, to prevent the balls from exiting either helical groove, with the means being a cut-out groove connected either at one end of the helical groove of the nut of the other end, and formed in a half-round shape on the end face of the nut, perpendicular to the axis center, with a clearance being formed on each land portion of one end portion or of the other end portion of the helical groove of the nut which is connected to the cut-out groove.

The second aspect of this invention provides a structure of a cut-out groove for the ball circuit appropriately to achieve the objectives of the first aspect of the invention, above.

The second aspect of this invention refers to a ball screw device with a tunnel raceway characterized in that the means to prevent the balls from exiting either helical groove is formed by a cut-out groove connected either at one end of the helical groove of the nut or the other end, and is formed in a half-round shape on the end face of the nut, perpendicular to the axis center, and is larger in diameter than that of the balls.

The third aspect of this invention provides a structure of a helical groove in the nut appropriately to achieve the objectives of the first aspect of the invention, above. Also, the third aspect of this invention provides an end face of the nut, in which one helical groove is supported at two points and the other helical groove is supported at one point, based on the baseline of 180 degrees as shown in the cross-sectional view of the helical groove, regardless of the type of tool used for forming the helical groove of the nut.

The third aspect of this invention refers to a ball screw device having a tunnel raceway of the first aspect of this invention, characterized in that a half-round cut-out for the balls to circulate, or a clearance is formed on each land portion of one end portion or of the other end portion of the helical groove of the nut which is connected to the cut-out groove, with the half-round cut-out having a cutout to form space extending to the axis direction.

The fourth aspect of this invention provides a structure of a helical groove and/or a land portion of the nut which appropriately achieves the objectives of the first aspect of this invention. Regarding the fourth aspect of this invention, the balls travel from one end of the helical groove, helically formed in the nut, through the opening of the through-hole, through the through-hole formed in the wall of the nut, with the balls returning to the other end of the helical groove, so that the number of balls aligned along one helical groove of the nut is increased. Therefore, the width and outer diameter of the nut can be smaller, and the high rotating torque of the nut can be changed into an axis transformation of the screw axis.

The fourth aspect of this invention refers to a ball screw device with a tunnel raceway of the first aspect of this invention, characterized in having a structure in which the diameter of the inner circumference of the nut, therein the helical groove of the nut, is larger than the outer diameter of the screw axis and about the same as the diameter of the cylindrical face on which the circulating balls in the orbit pass, with a land portion outside the helical groove being provided on both edges of the nut, from one end of the helical groove to the other end, from one side of the nut to the other side, with the guidepath being connected to the opening of the land portion through the through-hole and/or one end portion and/or the other end portion of the through-hole, and with the through-hole and helical cut-out groove being connected through the opening of the land portion.

The fifth aspect of this invention is to provide a structure of a helical groove and/or a land portion of the nut, to enable the slow-rotating balls to be completely guided and to achieve the appropriate objectives of the first aspect of the invention.

The fifth aspect of this invention refers to a ball screw device having a tunnel raceway of the first aspect of this invention, characterized in having a structure in which the diameter of the inner circumference of the nut, therein the helical groove of the nut, is larger than the outer diameter of the screw axis and about the same as the diameter of the cylindrical face on which the balls circulating in the orbit pass, with the land portions of the nut outside the helical groove being provided on both edges of the nut from one end of the helical groove to the other end, and from one side of the nut to the other side, with the guidepath being connected to the opening of the land portion through the through-hole and/or one end portion and/or the other end portion of the through-hole, and with the through-hold and helical cut-out groove being connected through the opening of the land portion, or a scale-like projection is provided on the guidepath of the tunnel raceway.

The sixth aspect of this invention is to provide a structure of a helical groove appropriately to achieve the objective of the first aspect of the invention. Also, the sixth aspect of this invention is to provide an end face of the nut, in which one helical groove is supported at two points and the other helical groove is supported at one point, based on the baseline of 180 degrees as shown in the cross-sectional view of the helical groove, regardless of the type of tool used for forming the helical groove of the nut.

The sixth aspect of this invention refers to a ball screw device having a tunnel raceway of the first aspect of this invention, characterized in that a filler material (deflector) is provided in the half-round cut-out groove on the helical groove of the nut or in the hole larger in diameter than that of the balls.

The seventh aspect of this invention covers the aforementioned features [1] to [7].

The seventh aspect of this invention refers to the method for manufacturing a ball screw device of a screw axis having a helical groove on its outer circumference for balls to circulate thereon, and a nut having a helical groove on its inner circumference for balls to circulate thereon, and a number of balls circulating in an orbit along the helical groove of the screw axis and the opposing helical groove of the nut, and a tunnel raceway (for the balls to circulate unlimitedly) characterized in having a through-hole cut within the wall of the nut for the balls to circulate from one end of the helical groove to the other end, with a guidepath formed on either end of the helical groove to feed the balls into the tunnel raceway, with a means provided between the helical groove on one end face of the nut and the helical groove on the screw axis to stop the balls from exiting either helical groove, with the means to prevent the balls from exiting either helical groove being a structure in which, based on the baseline of 180 degrees, as shown in the cross-sectional view of both helical grooves, one helical groove of the aforementioned nut is supported at two points, while the other helical groove (of the other orbit) is supported at one point, characterized in that a helical cut-out groove is provided by inserting the first tool, such as a cutting tool or the like, into a cut-out formed on the end face of the nut, or into a hole larger in diameter than the balls circulating through the guidepath, with a through-hole being provided within the tunnel raceway from one end of the outer circumference of the nut to the other end, by inserting the second tool into the hole to make a clearance for the balls to circulate toward the end face of the nut, with the clearance being communicated with the helical cut-out groove.

Effect of this Invention

The first aspect of this invention refers to a ball screw device of a screw axis with a helical groove on its outer circumference for balls to circulate thereon, a nut with a helical groove on its inner circumference for balls to circulate thereon, a number of balls to circulate in an orbit along the helical groove of the screw axis and the opposing helical groove of the nut, and a tunnel raceway (for the balls to circulate unlimitedly) characterized in comprising a through-hole formed within the wall of the nut for the balls to circulate from one end of the helical groove of the nut to the other end, with the through-hole having a guidepath on either end of the helical groove to feed the balls into the tunnel raceway, and a means provided between the helical groove on one end face of the nut and the helical groove on the screw axis, to prevent the balls from exiting either helical groove, with the means to prevent the balls from exiting either helical groove of the nut or the other end, and formed in a half-round shape on the end face of the nut, perpendicular to the axis center, with a clearance formed on each land portion of one end portion or of the other end portion of the helical groove of the nut which is connected to the cut-out groove.

Therefore, claim 1 of this invention has features described, below.

(1) Based on the cross-sectional view of the 180 degree baseline, showing both the helical groove of the nut and the screw axis, this invention provides a simple and basic structure to prevent the balls from exiting the tunnel raceway by the two-point support of one side of the helical groove and the one-point support of the other side of the helical groove, so that the number of component parts is reduced (i.e. large-sized deflectors for a guidepath or the like), thus providing a small-sized ball screw device.

(2) The aforementioned small-sized ball screw device is provided. Thus, a light-weight, small, electrically-operated linear motion device is provided.

(3) By making this ball screw device small and light-weight, the difficulty in manufacturing it is overcome. The device is durable, and the time and cost in manufacturing it is saved.

(4) Even after making the balls and/or the device smaller and light-weight, the load bearing property and/or rotation property of the balls is improved (the rotation property being made smoother), and its steering quality assuredly obtained. Fuel consumption is improved, which makes for efficient environmental sustainability.

(5) Abnormal noise from the nut and the through-hole and/or from the nut and the guidepath is mostly eliminated.

The second aspect of this invention refers to a ball screw device with a tunnel raceway characterized in that the means to prevent the balls from exiting either helical groove is formed by a cut-out groove connected either at one end of the helical groove of the nut or the other end, and is formed in a half-round shape on the end face of the nut, perpendicular to the axis center, and is larger in diameter than that of the balls.

Therefore, the second aspect of this invention has features in which the objectives of the first aspect of this invention is achieved, and that the most appropriate structure, the helical cutout groove is provided, or the like.

The third aspect of this invention refers to a ball screw device having a tunnel raceway of the first aspect of this invention, characterized in that a half-round cut-out for the balls to circulate, or a clearance is formed on each land portion of one end portion or of the other end portion of the helical groove of the nut which is connected to the cut-out groove, with the half-round cut-out having a cutout to form space extending to the axis direction.

Therefore, the third aspect of this invention is to achieve the objective of the first aspect of the invention, with features providing the most appropriate structure of a helical groove with an appropriate nut. Also, the third aspect of this invention is to provide an end face of the nut in which one helical groove is supported at two points and the other helical groove is supported at one point, based on the baseline of 180 degrees, as shown in the cross-sectional view of the helical groove, regardless of the type of tool used for forming the helical groove of the nut, or the like.

The fourth aspect of this invention refers to a ball screw device with a tunnel raceway of the first aspect of this invention, characterized in having a structure in which the diameter of the inner circumference of the nut, therein the helical groove of the nut, is larger than the outer diameter of the screw axis and about the same as the diameter of the cylindrical face on which the circulating balls in the orbit pass, with a land portion outside the helical groove being provided on both edges of the nut, from one end of the helical groove to the other end, from one side of the nut to the other side, with the guidepath being connected to the opening of the land portion through the through-hole and/or one end portion and/or the other end portion of the through-hole, and with the through-hole and helical cut-out groove being connected through the opening of the land portion.

Therefore, the fourth aspect of this invention is to achieve the objective of the first aspect of the invention, and to have features providing the most appropriate structure of a helical groove with the land portion of the nut, or the like.

The fifth aspect of this invention refers to a ball screw device having a tunnel raceway of the first aspect of this invention, characterized in having a structure in which the diameter of the inner circumference of the nut, therein the helical groove of the nut, is larger than the outer diameter of the screw axis and about the same as the diameter of the cylindrical face on which the balls circulating in the orbit pass, with the land portions of the nut outside the helical groove being provided on both edges of the nut from one end of the helical groove to the other end, and from one side of the nut to the other side, with the guidepath being connected to the opening of the land portion through the through-hole and/or one end portion and/or the other end portion of the through-hole, and with the through-hold and helical cut-out groove being connected through the opening of the land portion, or a scale-like projection is provided on the guidepath of the tunnel raceway.

Therefore, the fifth aspect of this invention is to achieve the objective of the first aspect of the invention, with features providing the most appropriate structure of a helical groove, with the land portion of the nut enabling the slow-circulating balls to be completely guided.

The sixth aspect of this invention refers to a ball screw device having a tunnel raceway of the first aspect of this invention, characterized in that a filler material (deflector) is provided in the half-round cut-out groove on the helical groove of the nut or in the hole larger in diameter than that of the balls.

Therefore, the sixth aspect of this invention is to achieve the objective of the first aspect of the invention, with features providing the most appropriate structure of a helical groove with an appropriate nut. Also, the sixth aspect of this invention is to provide an end face of the nut in which one helical groove is supported at two points and the other helical groove is supported at one point, based on the baseline of 180 degrees, as shown in the cross-sectional view of the helical groove, regardless of the type of tool used for forming the helical groove of the nut.

The seventh aspect of this invention refers to the method for manufacturing a ball screw device of a screw axis having a helical groove on its outer circumference for balls to circulate thereon, and a nut having a helical groove on its inner circumference for balls to circulate thereon, and a number of balls circulating in an orbit along the helical groove of the screw axis and the opposing helical groove of the nut, and a tunnel raceway (for the balls to circulate unlimitedly) characterized in having a through-hole cut within the wall of the nut for the balls to circulate from one end of the helical groove to the other end, with a guidepath formed on either end of the helical groove to feed the balls into the tunnel raceway, with a means provided between the helical groove on one end face of the nut and the helical groove on the screw axis to stop the balls from exiting either helical groove, with the means to prevent the balls from exiting either helical groove being a structure in which, based on the baseline of 180 degrees, as shown in the cross-sectional view of both helical grooves, one helical groove of the aforementioned screw axis is supported at two points, while the other helical groove of the aforementioned nut is supported at one point, characterized in that a helical cut-out groove is provided by inserting the first tool, such as a cutting tool or the like, into a cut-out formed on the end face of the nut, or into a hole larger in diameter than the balls circulating through the guidepath, with a through-hole being provided within the tunnel raceway from one end of the outer circumference of the nut to the other end, by inserting the second tool into the hole to make a clearance for the balls to circulate toward the end face of the nut, with the clearance being communicated with the helical cut-out groove.

Hence, the seventh aspect of this invention has the following features.

Features (1) to (5) are described above Feature (6): To provide a through-hole and its guidepath which penetrates the ball helical groove to the inner circumference of the nut, the first tool is inserted into the half-round helical groove provided on the inner circumference of the nut, or into a hole of a diameter larger than that of the balls, so as to provide a method for manufacturing the ball screw device in which most of the through-hole is properly formed on the inner wall of the nut.

Feature (7): The number of component parts is reduced, and a simple method for manufacturing the small-sized ball screw device is provided.

BRIEF DESCRIPTION OF THE FIGURES

FIG. 3-1 shows the process in the first embodiment in providing a clearance in the nut to allow the balls to circulate toward the end face of the nut. FIG. 3-1 also shows the process in providing the helical groove (guidepath) on the nut and is also an oblique view of the first tool being threaded into the outer circumference of the end face of the nut (accordingly, a preformed groove can be used for the first tool to be threaded into).

FIG. 3-2 shows the process in the first embodiment in providing a clearance in the nut to allow the balls to circulate toward the end face of the nut and also shows the helical groove and guidepath being processed by the second tool after being threaded by the first tool in the outer circumference of the end face of the nut.

FIG. 3-3 shows the process in the first embodiment in providing a clearance to allow the balls to circulate toward the end face of the nut, and shows that a helical groove (guidepath) is provided on the nut. FIG. 3-3 is also an oblique view of the mouth of the guidepath into which the second tool is inserted after the first tool was threaded into the outer circumference of the end face of the nut.

FIG. 4-1 shows processes in the first embodiment in providing a guidepath and tunnel raceway on the outer circumference of the nut by inserting the second tool into the opening of the guidepath to allow the balls to circulate in the nut. It also shows the second tool being threaded into the opening of the guidepath of the nut.

FIG. 4-2 shows the processes in the first embodiment in providing a guidepath and tunnel raceway on the outer circumference of the nut by inserting the second tool into the opening of the guidepath to allow the balls to circulate in the nut. FIG. 4-2 is also an overhead view of FIG. 4-1.

FIG. 4-3 shows the processes in the first embodiment in providing a guidepath and tunnel raceway on the outer circumference of the nut by inserting the second tool into the opening of the guidepath to allow the balls to circulate in the nut. FIG. 4-1 is also an oblique view of the main section of the cross-sectional view of b-b.

FIG. 5-1 shows another embodiment of the first embodiment and is also an oblique view of the whole nut.

FIG. 5-2 shows another embodiment of the first embodiment and is also an oblique view of the main section of FIG. 5-1.

FIG. 5-3 shows another embodiment of the first embodiment and is also a cross-sectional view of the main section of FIG. 5-1.

FIG. 6-1 is an oblique view of one land portion of the nut in the second embodiment, showing the nut and screw threaded together on the same axis.

FIG. 6-2 is the cross-sectional view of FIG. 6-1 in the second embodiment.

FIG. 6-3 is an enlarged cross-sectional view of the main section of FIG. 6-2 in the second embodiment.

FIG. 6-4 is a schematic end view of FIG. 6-1 in the second embodiment.

FIG. 7-1 is an oblique view of one land portion of the nut in the third embodiment showing the nut and screw threaded together on the same axis.

FIG. 7-2 is a side view of FIG. 7-1 in the third embodiment.

FIG. 7-3 is a cross-sectional view of the main section of the third embodiment.

FIG. 7-4 is a schematic end view of FIG. 7-1 in the third embodiment.

FIG. 8-1 is an oblique view of one land portion of the nut in the fourth embodiment showing the nut and screw threaded together on the same axis and its status before filler material is inserted in the cut-out of the nut.

FIG. 8-2 is an oblique view of one land portion of the nut in the fourth embodiment showing the nut and screw threaded together on the same axis and its status after filler material has been inserted in the cut-out of the nut.

FIG. 8-3 is an oblique view of one land portion of the nut in the fourth embodiment showing the nut and screw threaded together on the same axis.

FIG. 8-4 is a schematic end view of FIG. 8-3 of the fourth embodiment showing its status before a hole is provided.

FIG. 8-5 is a schematic end view of FIG. 8-3 of the fourth embodiment showing filler material having been inserted in the hole.

DESCRIPTION OF THE REFERENCE NUMBERS

Figure 1:
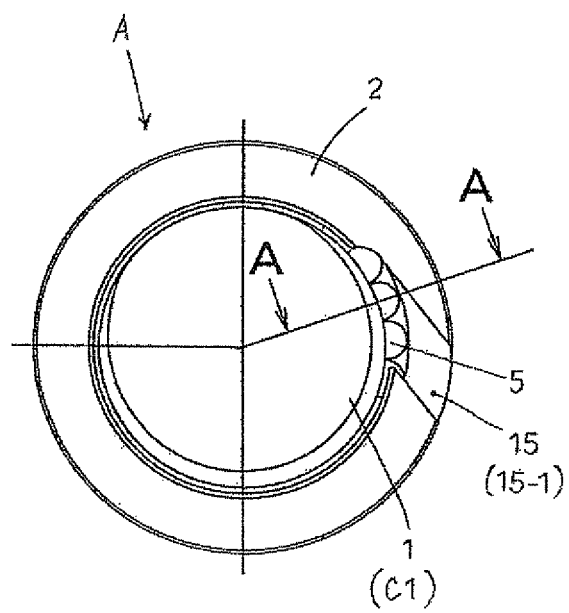
FIG. 1 is an end view of one land portion of the nut, showing the nut and screw engaged on the same axis.

A: Ball screw device
C1: Rack shaft
D1: Diameter
D2: Diameter
1: Screw axis
100: Helical groove of the screw
100a: One end of the helical groove of the screw
100b: Other end of the helical groove of the screw
2: Nut
2A: Outer circumference
2A-1: One end of the outer circumference of the nut
2A-2: Other end of the outer circumference of the nut
200: Helical groove of the nut
200a: One end of the helical groove of the nut
200a-1: End face of the nut
200b: Other end of the helical groove of the nut
200b-1: End face of the nut
201: Helical cut-out groove of the nut
201-1: Helical cut-out groove of the nut
202: Opening
202-1 Opening
203: Land portion of the nut
203-1: Land portion of the nut
3: Orbit
5: Ball
6: Tunnel raceway
600: Bottom portion
10: Through-hole
10a: One end of the tunnel raceway
10b: Other end of the tunnel raceway
11: Guidepath
11-1: Guidepath
15: Cut-out portion
15-1: Cut-out portion
16: Clearance
16-1: Clearance
20: First tool
21: Second tool
22: Projection
30: Access way
30-1: Access way
31: Hole
31-1: Hole
40: Cut-out
41: Filler material
42: Hole

[Preferred Embodiment of this Invention]

Hereinafter, the preferred embodiments of this invention are specifically described with reference to the drawings.

Figure 2:
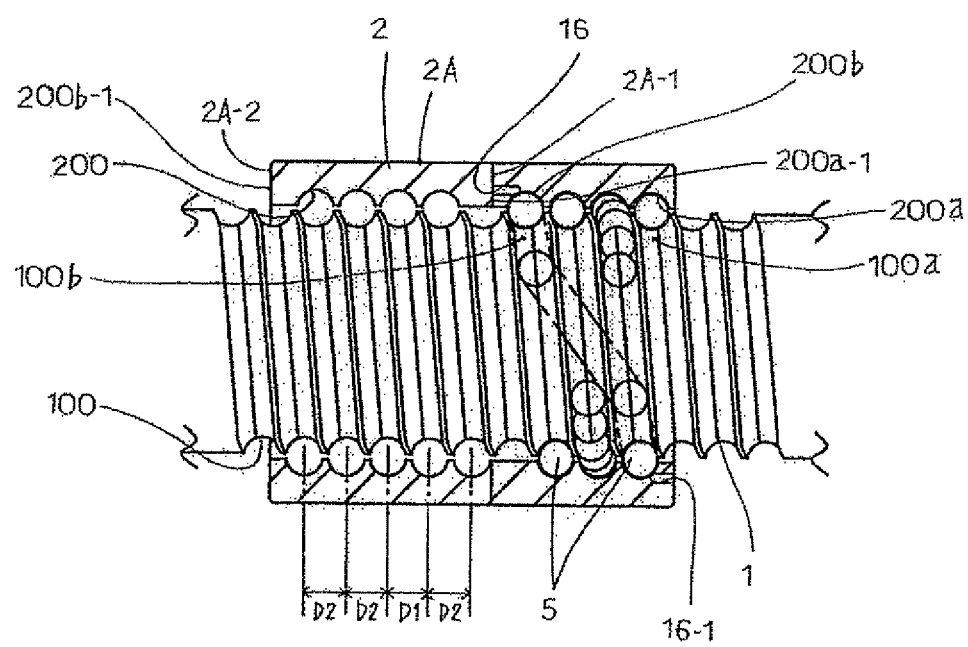
FIG. 2 is a side view of the main section of the electrically-operated steering apparatus in which the ball screw device of FIG. 1 is used.
Figures 1, 3:
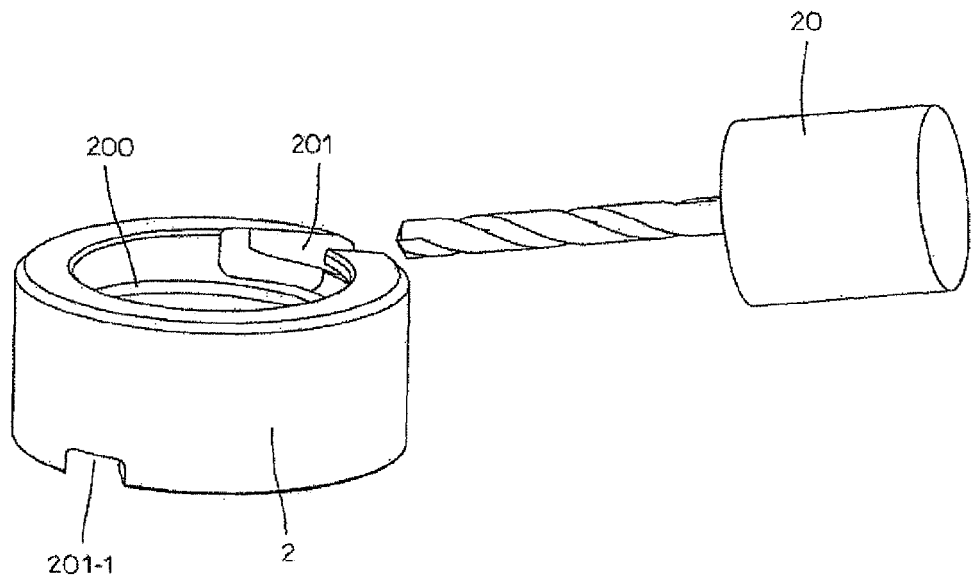
Figures 2, 3:
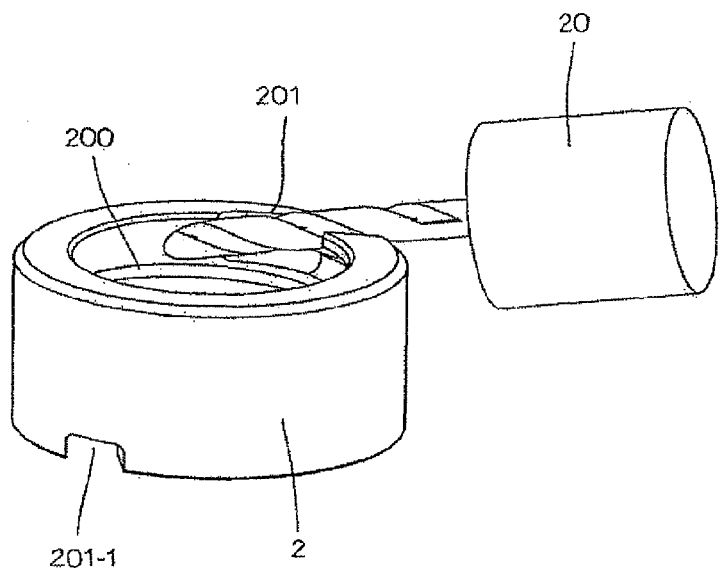
Figure 3:
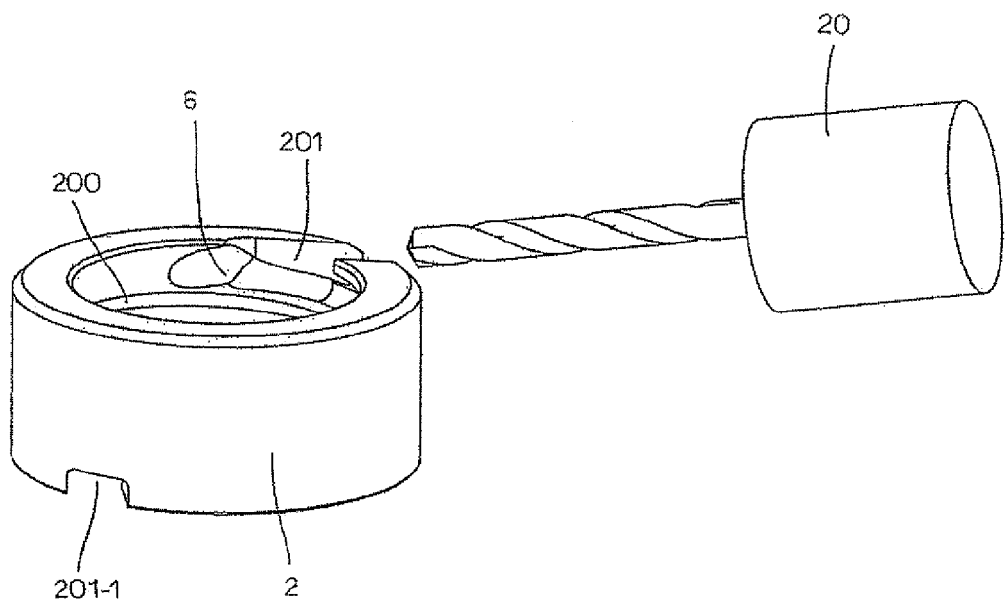
Figures 1, 4:
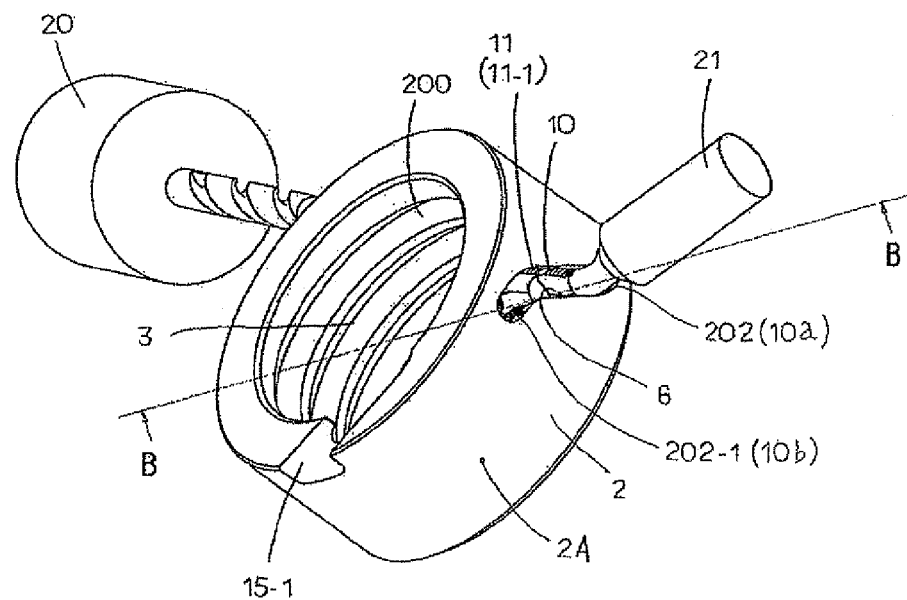
Figures 2, 4:
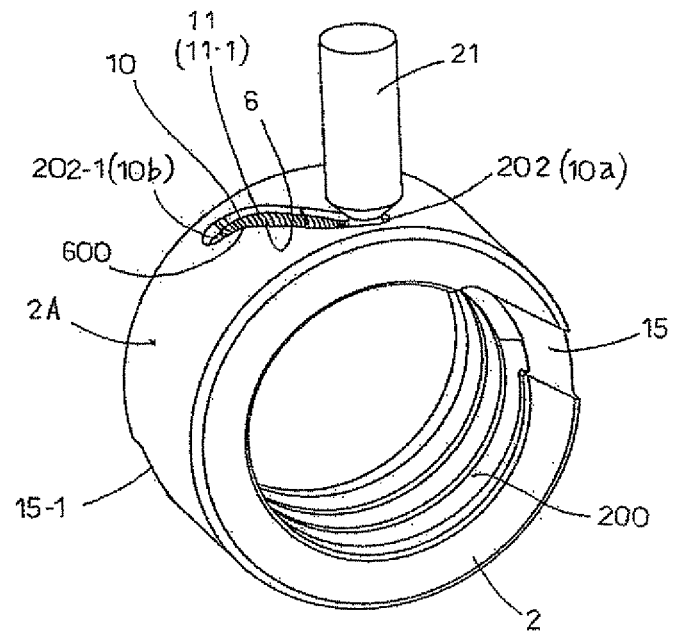
Figures 3, 4:
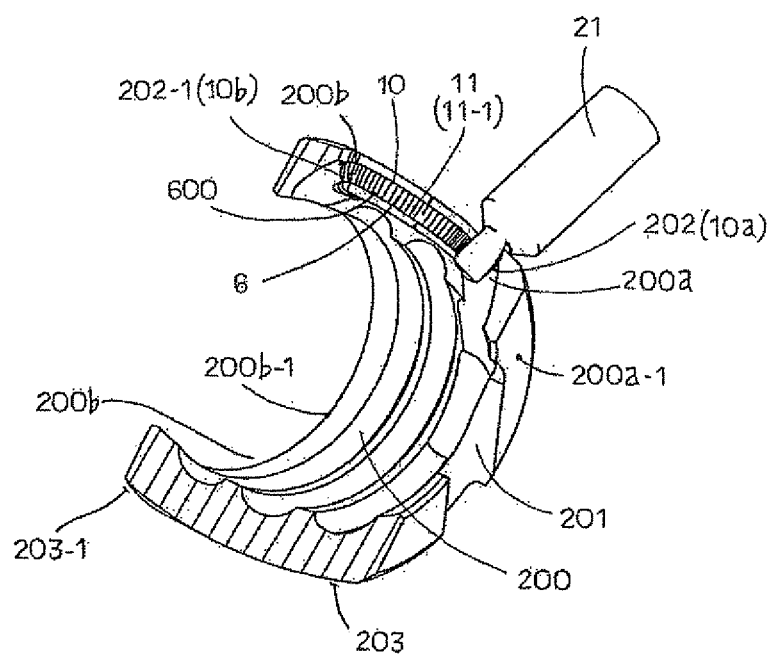
Figures 1, 5:
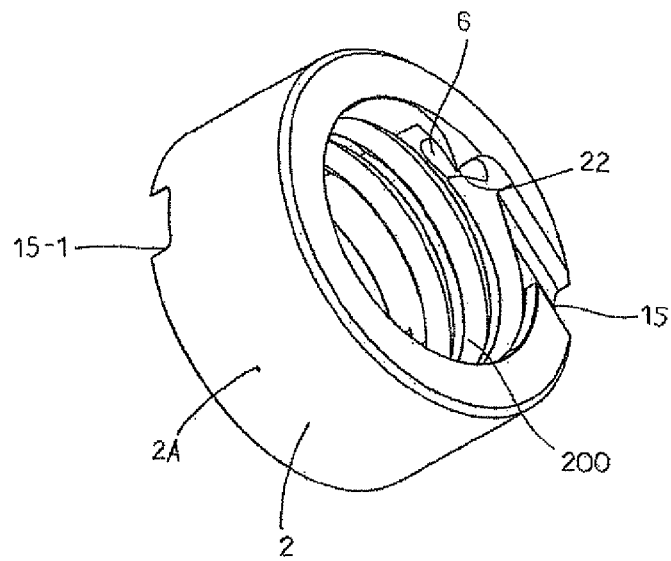
Figures 2, 5:
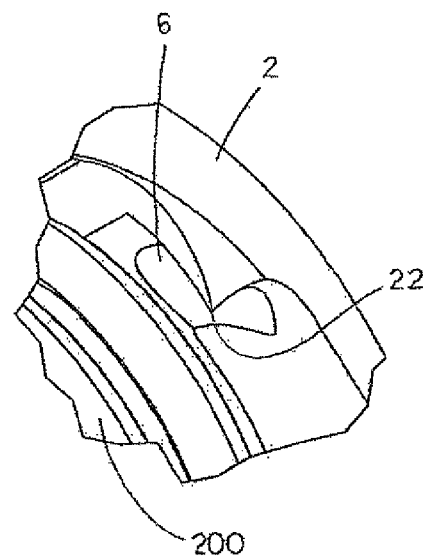
Figures 3, 5:
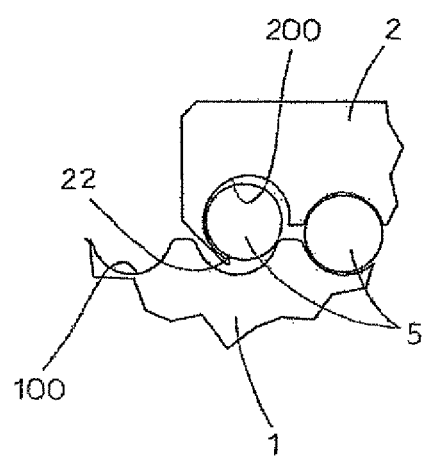
Figures 1, 6:
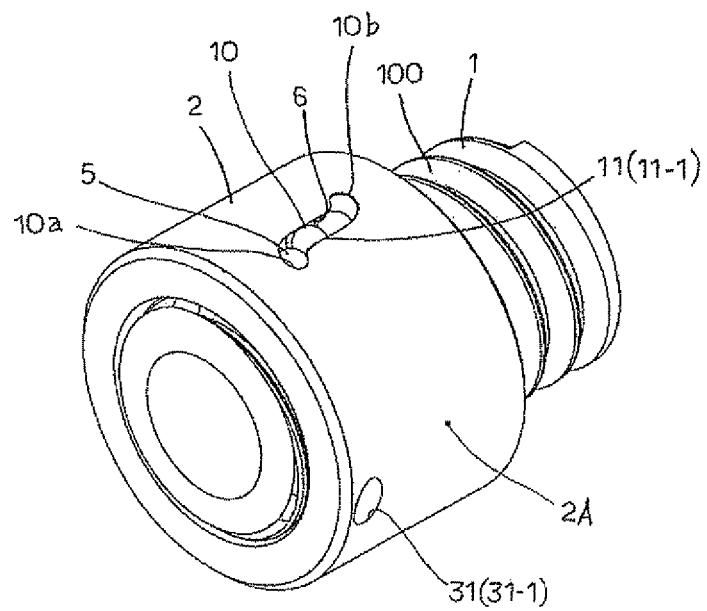
Figures 2, 6:
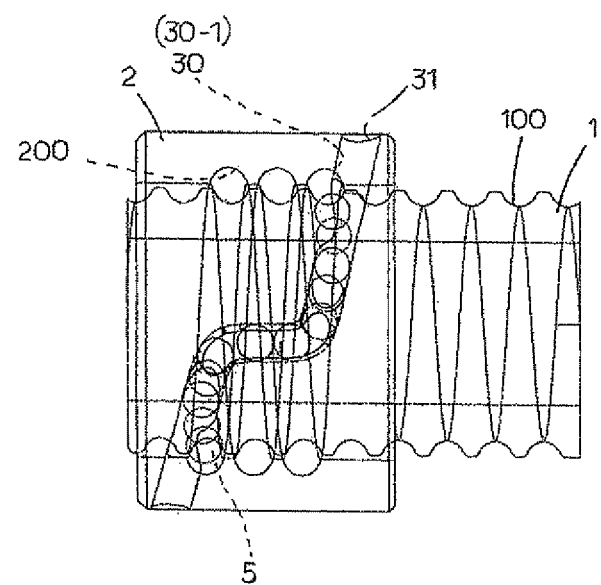
Figures 3, 6:
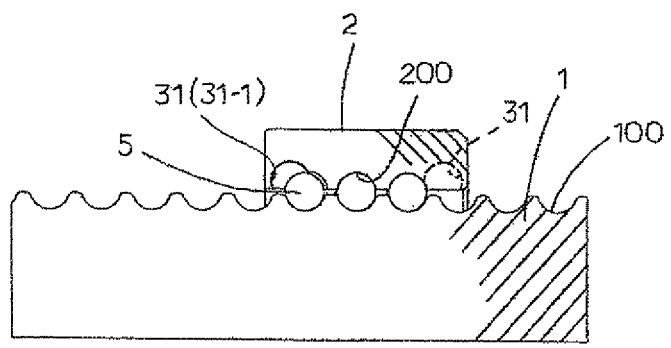
Figures 4, 6:
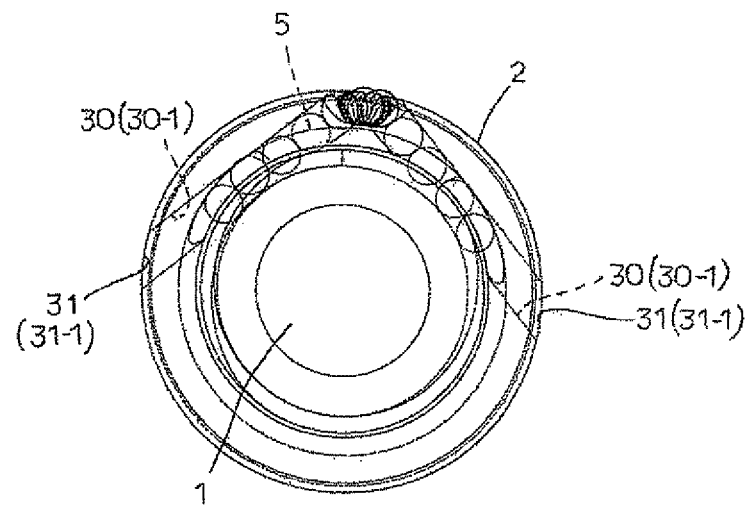
Figures 1, 7:
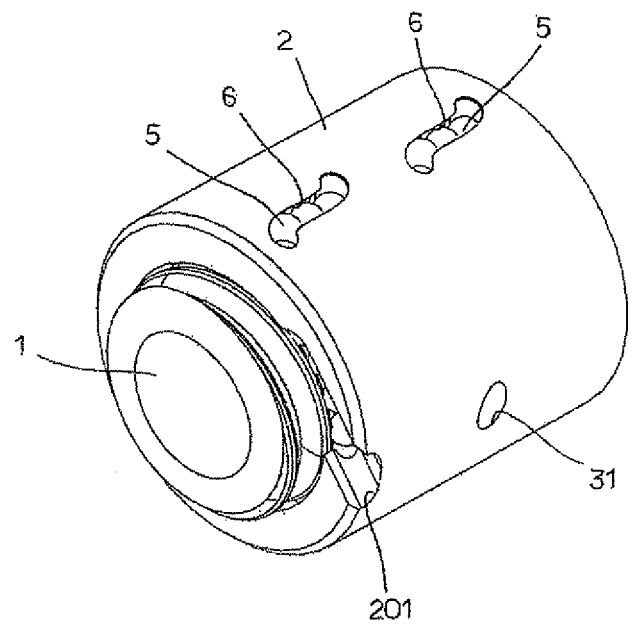
Figures 2, 7:
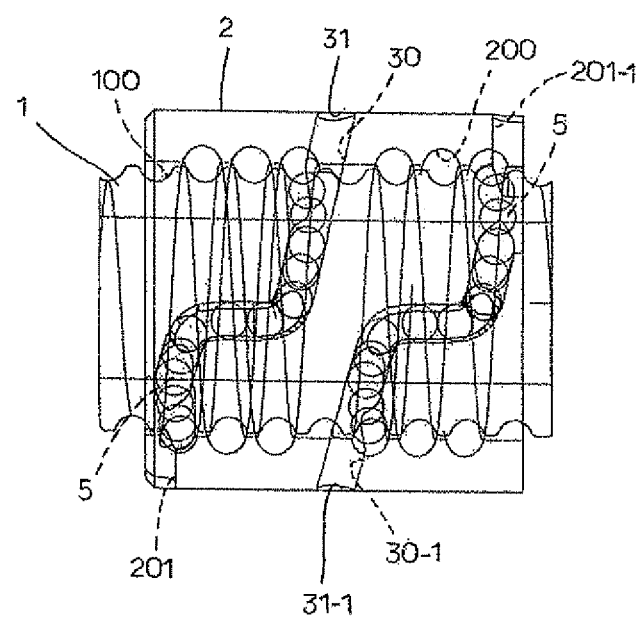
Figures 3, 7:
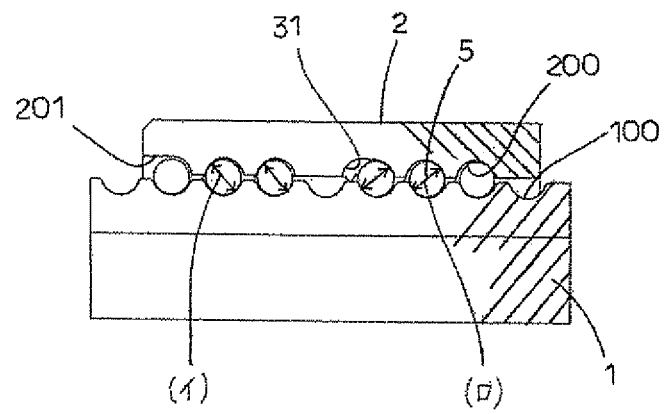
Figures 4, 7:
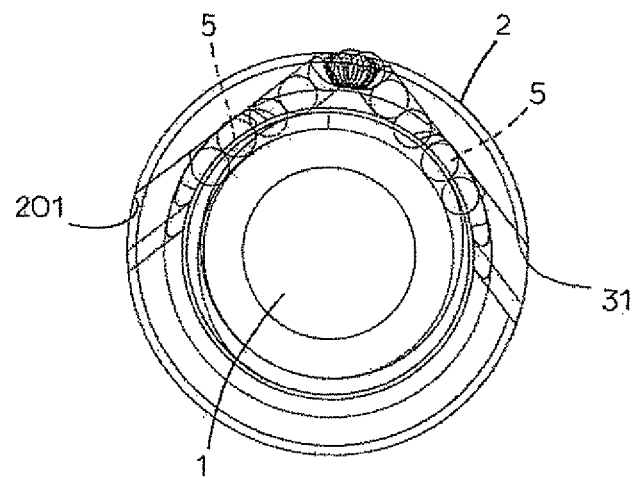
Figures 1, 8:
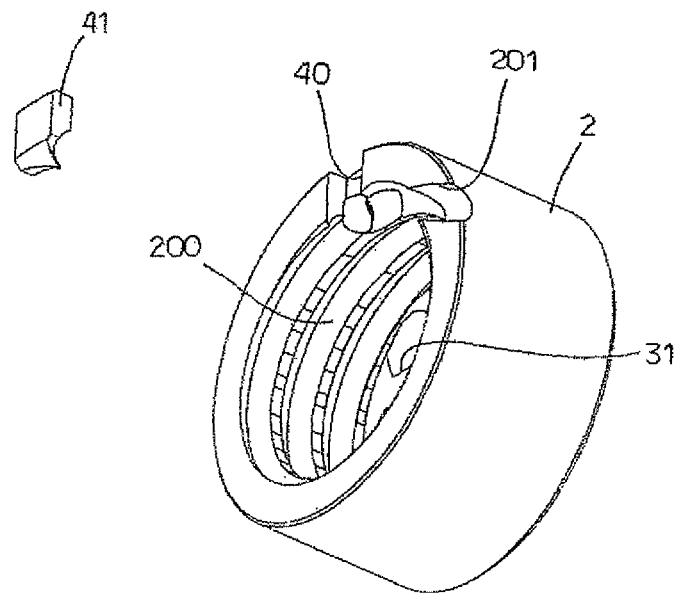
Figures 2, 8:
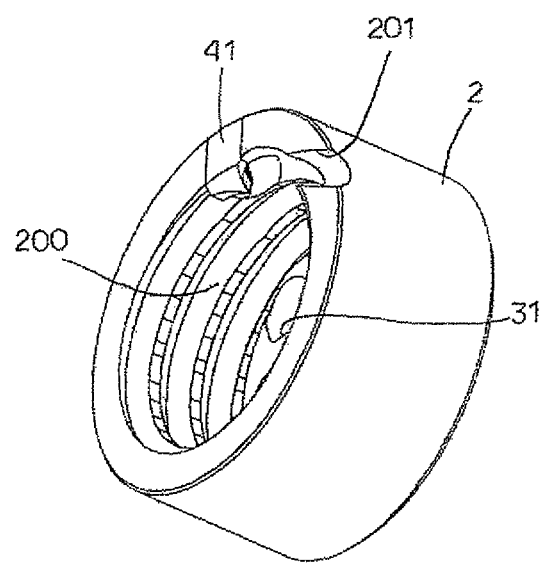
Figures 3, 8:
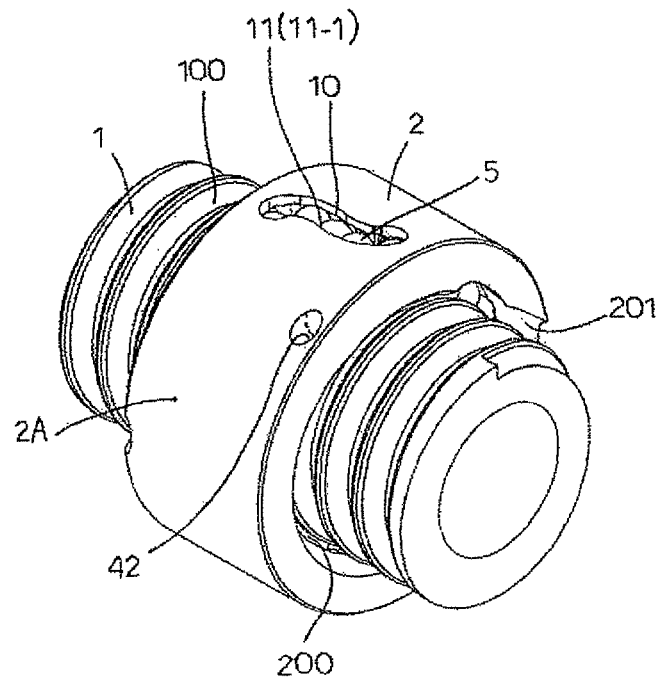
Figures 4, 8:
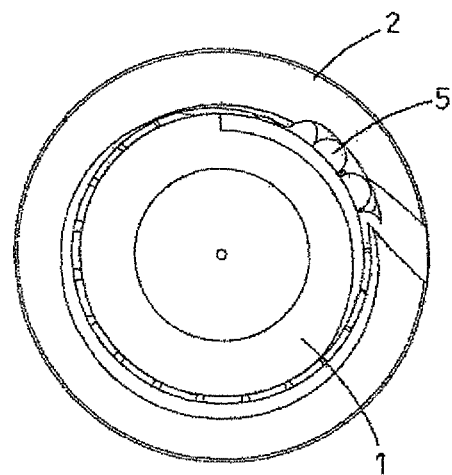
Figures 5, 8:
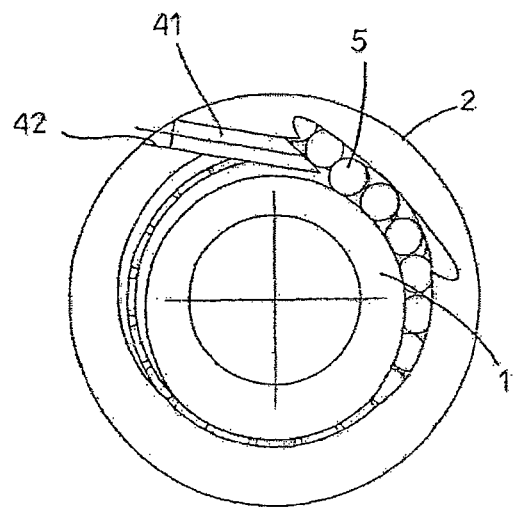
Figure 9:
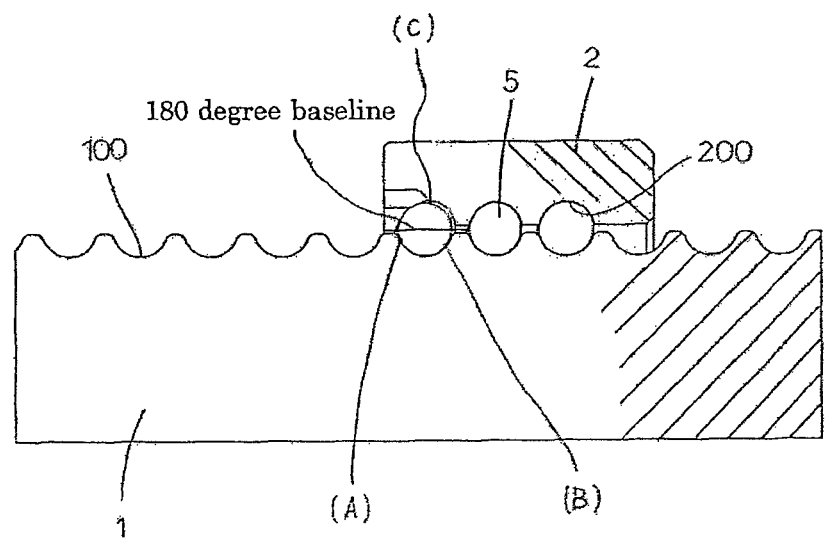
FIG. 9 is a conceptual diagram showing the relationship along the line of orbit (made by the sides of both helical grooves) on the 180 degree baseline and the support point.

The figures are explained here. FIGS. 1 to 5-3 show the first embodiment of this invention. FIG. 1 is an end view of the nut and screw engaged on the same axis. FIG. 2 is a side view of the main section of the electrically-operated steering apparatus in which the ball screw device of FIG. 1 is used. FIGS. 3-1 to 3-3 show the process in providing a clearance in the nut to allow the balls to circulate toward the end face of the nut. FIGS. 3-1 to 3-3 also show the process in providing the helical groove (guidepath) on the nut. FIG. 3-1 is an oblique view of the first tool being threaded into the outer circumference of the end face of the nut (accordingly, a preformed groove can be used for the first tool to be threaded into). FIG. 3-2 is an oblique view showing the helical groove and guidepath to be processed by the second tool after being threaded by the first tool in the outer circumference of the end face of the nut. FIG. 3-3 is an oblique view of the mouth of the guidepath into which the second tool inserted after the first tool is threaded into the outer circumference of the end face of the nut. FIGS. 4-1 to 4-3 show the processes to provide a guidepath and through-hole (tunnel raceway) on the outer circumference of the nut by inserting the second tool into the opening of the guidepath for the balls to circulate within the nut. FIG. 4-1 is an oblique view of the second tool being threaded into the opening of the guidepath of the nut. FIG. 4-2 is an overhead view of FIG. 4-1. FIG. 4-3 is an oblique view of the main section of the cross-sectional view of b-b. FIGS. 5-1 to 5-3 show other embodiments of this invention. FIG. 5-1 is an oblique view of the whole nut. FIG. 5-2 is an oblique view of the main section of FIG. 5-1. FIG. 5-3 is a cross-sectional view of the main section of FIG. 5-1. FIGS. 6-1 to 6-4 show the second embodiment of this invention. FIG. 6-1 is an oblique view of one land portion of the nut and screw threaded together on the same axis. FIG. 6-2 is a cross-sectional view of FIG. 6-1. FIG. 6-3 is an enlarged cross-sectional view of the main section of FIG. 6-2. FIG. 6-4 is a schematic end view of FIG. 6-1. FIGS. 7-1 to 7-4 show the third embodiment of this invention. FIG. 7-1 is an oblique view of one land portion of the nut and screw threaded together on the same axis. FIG. 7-2 is a side view of FIG. 7-1. FIG. 7-3 is a cross-sectional view of the main section. FIG. 7-4 is a schematic end view of FIG. 7-1. FIGS. 8-1 and 8-2 show the fourth embodiment of this invention. FIG. 8-1 is an oblique view of one land portion of the nut and screw threaded together on the same axis, and the status of the nut before filler material is inserted in the cut-out of the nut. FIG. 8-2 shows an oblique view of one land portion of the nut and screw threaded together on the same axis, and the status of the nut after filler material has been put in the cut-out of the nut. FIGS. 8-3 to 8-5 show the fourth embodiment of this invention. FIG. 8-3 is an oblique view of one land portion of the nut and screw threaded together on the same axis. FIG. 8-4 is a schematic end view of FIG. 8-3 showing the status of the nut before the hole is provided. FIG. 8-5 is a schematic end view of FIG. 8-3 showing filler material having been inserted into the hole. FIG. 9 is a conceptual diagram showing the relationship along the line of orbit (made by the joined helical grooves) on the 180 degree baseline and the support point.

A ball screw device to transmit rotational movement of an electric motor to linear movement in this invention is applied to an electrically-operated steering apparatus for automobile use (not shown in figure). The electrically-operated steering apparatus for automobile use is provided on either the right side or left side of an automobile, with an aluminum housing comprising a rack shaft, the ball screw device or an input axis, and the electric motor or the like.

The housings for the electrically-operated steering apparatus are provided on both ends of the cylindrical motor housing, and each hollow rack housing is coaxially engaged in a cylindrical shape. The housings are affixed to an automobile body (not shown in figure), with the screws running through a mounting portion which is formed on the rack housing.

A rack shaft is inserted and aligned in the housing. Rack teeth are formed on one-side of the outer circumference of the rack shaft. The rack teeth are engaged with the pinion gear in which the input axis with the steering wheel is provided. The pinion gear rotates, so as to move the rack shaft in an axis (wheel) direction.

In the first embodiment of this invention, or on the outer circumference of the other side of the rack shaft C1, a screw axis 1 is formed on a ball screw device A. Also, the ball screw device A, as shown in FIGS. 1 and 2, comprises a screw axis 1 having a helical groove 100 on its outer circumference, and a nut 2 having a helical groove 200 on its inner circumference, and balls 5 to circulate in an orbit 3 formed by the joined helical groove 100 of the screw axis 1 and the helical groove 200 of the nut 2, thus forming a tunnel raceway 6 allowing for the balls to circulate unlimitedly from one end 200a of the helical groove 200 of the nut 2 to the other end 200b of the helical groove 200 of the nut 2.

Appropriate pressure is provided between the helical groove 100 of the screw axis 1 and the helical groove 200 of the nut 2, along which the balls 5 circulates. When the rotation of the screw axis 1 is regulated, and a pair of nuts 2 are connected, while the rotation of the nuts 2 are regulated, and a certain amount of torque is applied to one nut 2, power is generated to let the screw axis 1 move in an opposite direction from where the other nut 2 moves. Thus, the balls 5 in contact with the side of the groove closer to one nut 2 of the helical groove 200 than the other nut 2, makes contact with the side of the groove farther from the one nut 2 of the helical groove 100 of the screw axis 1, and the balls 5 in contact with the side closer to the groove of the other nut 2 of the helical groove 200 than the first nut 2, makes contact with the groove farther from the nut 2 of the helical groove of the screw axis 1, so as to form a pressurized circuit.

Provided in the wall of the nut, as shown in FIGS. 3-1 to 4-3, is the tunnel raceway 6 comprising the through-hole 10 and the guidepath 11 at one end 10a of the through-hole 10 and another guidepath 11-1 (like that of guidepath 11) at the other end 10b of the through-hole 10, to allow the balls 5 to circulate from one end 200a of the helical groove 200 of the nut 2 to the other end 200b of the helical groove of the nut 2. The balls 5 enters the tunnel raceway 6 through guidepath 11 and circulate along the orbit 3 (screw groove) formed by the joined helical grooves 100 and 200 and then exit guidepath 11-1. The end faces 200a-1 and 200b-1 of the nut 2 are formed with a half-round helical cut-out groove 201. (The helical cut-out groove 201 is formed by halving one end face 200a and the other end face 200b of the helical groove 200, perpendicular to its axis). Thus, a space is formed between the helical groove 200 and the helical cut-out groove 201. However, no problem will arise concerning the movement of the device and/or the circulation of the balls 5 in this invention, and the same effect as in a conventional invention is achieved. Also, based on the baseline of 180 degrees, as shown cross-sectionally of helical grooves 100 and 200 (orbit 3), if the balls 5 are supported by one helical groove 100 (or the other helical groove 200) at two points and the other helical groove 200 at one point, the balls 5 will not separate but circulate smoothly. In the same way, based on the baseline of 180 degrees, as shown cross-sectionally of helical groove 100, if the balls 5 are supported by the helical groove 100 (or the helical cut-out groove 201 of the nut 2) at two points and the helical cut-out groove 201 (or the helical groove 100) at one point, the balls 5 will not separate but circulate smoothly as long as the nut 2 is not separated from the screw axis 1 (as long as the end faces of the screw 1 and the nut 2 does not become one axis). FIG. 9 shows the supporting points (A), (B), and (C).

If a pair of nuts 2 are provided, two different structures can be adopted, such that the helical cut-out groove 201 is provided on either one end face or on both end faces 200a-1 of one end 201 of one nut 2 and on the end face 200b-1 of the other end 200b-1 of the other nut 2. Such a structure, comprised of both end faces 200a-1 and 200b-1 of the nut 2, will allow for the balls to circulate more smoothly and thus simplify the steering operation.

The balls 5 circulate through the through-hole 10 from one end 200a to the other end 200b of the helical groove 200 of the nut 2. As an example of the orbiting route, the balls 5 move from one end 200a of guidepath 11, to one end 10a of the through-hole 10, to the other end 10b of the through-hole 10 of guidepath 11-1, to the other end 200b of the through-hole 10.

Then, the balls 5 circulate from the other end 200b of the helical groove 200 to the other end 200a. The balls 5 thus circulate unlimitedly through the orbit 3 made by the nut 2 and the screw axis 1, the tunnel raceway 6 or the like.

An example of forming the guidepath 11, 11-1, the half-round shaped helical cut-out groove 201, 201-1 is described here. The first tool 20 (of a cutting blade, such as a drill or the like) is inserted into the cut-out portion 15 (15-1) formed on the end face 200a-1 of one end 200a of the nut 2 and on the end face 200b-1 of the other end 200b of the nut 2, so as to cut an opening (outer diameter opening) 202 (202-1) to extend to the outer diameter 2A. The second tool 21 (of a ball-end mill or the like) is then inserted into the opening 202 (202-1), so as to cut (process) a tunnel raceway 6 running from one end 2A-1 of the outer diameter 2A of the nut 2 to the other end 2A-2 of the outer diameter 2A of the nut 2, and making a clearance 16 (16-1), so that the balls 5 can circulate from the helical cut-out groove 201 of the nut to the end face 200a-1 (200b-1) of the nut, and finally the tunnel raceway 6 is formed so that the clearance 16 and the helical cut-out groove 201 are connected. Using an electrical-spark process, as well as the cutting process, results in a more accurate processing (structure), with the smallest processing (to employ very small diameter balls 5) having no distortion or the like. Such an accurate and/or small processing can reduce the size of the device. Furthermore, the electrical spark process can simplify and/or reduce the production process, so that the process is simplified, and resin forming can also be adopted.

The aforementioned cut-out portion 15 and/or the opening 202-1 can be formed when the nut 2 is formed. In this structure, a simple and accurate process can be done through the opening 202-1 with the second tool 21 and its copying device (not shown in the drawings). It is preferable to process the bottom portion 600 of the tunnel raceway 6 in the direction of the screw axis 1 to form the tunnel raceway 6, to allow the balls 5 to easily circulate and reduce the friction to allow the balls 5 to be released in the opening 202-1, so that a part of each ball 5 is exposed to allow each ball 5 to easily circulate or the like.

The diameter D2 of the inner circumference of the aforementioned nut 2 is larger than the outer circumference of the aforementioned screw axis 1, and close to the diameter D1 of the cylindrical face where the center of the balls 5 pass through the orbit 3 or around the diameter D1. Then, the balls 5, moving through the guidepath 11 are scooped up at one end 10a of the through-hole 10, provided on the land portion 203 (203-1) and/or the helical cut-out groove 201, and provided on the other end 10b of the through-hole 10 and the clearance 16 of the land portion 203, so as to feed the balls 5 into the through-hole 10.

An operational example of the electrically-operated steering apparatus will be described here. When a steering wheel is operated, and steering torque is transmitted to an input axis by a steering shaft, the steering torque is transformed into steering power by a rack-and-pinion structure (consisting of a rack gear and a pinion gear), since the rack shaft C1 is transmitted in an axial direction. At this time, a torque sensor (not shown in the drawings) detects the steering torque, and a rotating-angle detection sensor (not shown in the drawings) detects the rotational position, or the like, of the rotor (not shown in the drawings) of the electric motor (not shown in the drawings). Based on the steering torque and the rotational position or the like of the rotor of the electric motor, and according to a detection value, or the like, of the torque sensor and the rotating-angle detection sensor, a control circuit (not shown in the drawings) operates auxiliary torque which is transformed into auxiliary steering power, with the ball screw device A supporting the rack shaft C1 to channel in an axial direction. Thus, for the driver, the steering force of the steering wheel is reduced.

In the ball screw device A, in which the nut 2 rotates to the rack shaft C1, together with the rotor by the electric motor, each of the balls 5 circulate in the orbit 3 under load. For example, if the rotor turns clockwise, the balls 5 return from one end 200a of the helical groove 200 of the nut 2, which is spirally and multiply coiled, as previously mentioned, and enter the guidepath 11 at one end 10a of the through-hole 10 and circulate to the other end 10b of the through-hole 10 and the guidepath 11-1, to the other end 200b of the helical groove 200 of the nut 2.

FIGS. 5-1 to 5-3 show an embodiment of this invention. Projection 22 (of an angled structure) is provided on the guidepath 11, 11-1 of the through-hole 10. Preferably, the projection 22 is provided on the interface of the helical cut-out groove 201, 201-1 and the through-hole 10, so that the balls 5 will not exit even as they circulate at a low speed consistently through the through-hole 10. Therefore, the balls 5 are channeled surely into the through-hole 10 at various speeds to simplify the working of the steering operation. As a condition for providing the aforementioned projection 22, it is preferable that the diameter D2 of the inner circumference of the nut 2 be axially smaller than the diameter D1 of the cylindrical face where the balls 5 are circulating in the orbit 3, and also the projection 22 (of an angled structure) is provided on the inner section of the diameter D1 of the cylindrical face where the balls 5 pass. The balls 5 are inverted into the tunnel raceway 6 comprising the helical groove 100 of the screw axis 1 and helical groove 200 of the nut 2 by using the conventional tools and/or methods.

In the second embodiment of this invention, a hole 31, 31-1 of a diameter larger than that of the ball 5s, is made on the guidepath 11, 11-1 across the helical orbit 3 on one end 10a of the tunnel raceway 10 and on the other end 10b of the tunnel raceway 10 to allow a way of access. This structure can be of use in a wide range of fields, and is effective in making ends 200a and 200b of the nut 2 flat and attractive-looking, if so desired. Other structures are pursuant to the aforementioned first embodiment. Also, the hole 31, 31-1 of a diameter larger than that of the balls 5 can be replaced with the aforementioned helical cut-out groove 200 (applicable for the other embodiments).

The third embodiment is a structure incorporating the second embodiment. The basic structure of the third embodiment is the same as that of the second embodiment, which provides a strong and durable ball screw device for its corresponding weight. FIG. 7-3 shows a structure in which precompression is applied to the right and left sides of the balls 5. Such a structure makes it possible to adjust the load and resistance to the nut 2 in the operation of the steering force. This structure is of practical use for racing cars (other structures are also available). Arrows a and b in FIG. 7-3 indicate the opposing directions of precompression.

In the fourth embodiment of this invention, if the land portion 203 cannot be provided due to the lack of a helical cut-out groove 200, and the processing tool which cannot be suspended in the middle of the cutting process is used, the cut-out 40 is formed on the orbit 3 (helical groove 100, 200), on the access way 30, 30-1, or on the helical cut-out groove 201. Therefore, the cut-out 40 should be filled with material, so as to restore the original structure. In the drawing, when the cut-out 40 is formed on the helical cut-out groove 201, a filler material 41 is inserted into the cut-out 40 to fill it. (FIGS. 5-1 to 5-3 show the structure in which the projection 22 in the shape of a scale is provided on the guidepath 11, 11-1.) Furthermore, another example is described here. Although the processing tool described above is preferable, other processing tools can be used for covering (blocking) the process error or for making the end 200a-1, or the like, of the nut 2 flat. Other examples are pursuant to each embodiment, as described above.

As an example of the fourth embodiment of this invention, when using a processing tool which cannot be suspended in the middle of cutting the helical groove 200, it is possible to change the course of the ball 5 by using a filler material 41 such as a pin or the like driven into the hole 42 of the outer diameter 2A of the nut 2 (another example being the structure of the guidepath 11, 11-1 with the scale-shaped projection 22 as shown in FIGS. 5-1 to 5-3), so that the ball 5 will not exit and thus is consistently guided into the through-hole 10.

INDUSTRIAL APPLICABILITY

This invention relates to a ball screw device (including a screw-drive transmission device) for changing the rotary motion of an electric motor to translational motion, in the case where an electric motor is used as the motive energy for translational movement. The conventional ball screw device is a structure comprising a screw axis with its outer circumference being a helical groove on which the balls of the device circulate, and a nut with a helical groove on its inner circumference and screwed onto the screw axis for the balls to circulate in an aligned orbit formed by the joining of the groove of the screw axis and the groove of the nut, to form a circuit (tunnel raceway) running from one end of the groove to the other end for the balls to circulate unlimitedly. Hence, additional parts to cover the tunnel raceway are required, or even if such additional parts are not required, special tools and operations are needed. Thus, this invention realizes the manufacturing of a ball screw device using general-purpose tools and simple methods at low cost to provide a ball screw device having a through-hole and a guidepath to guide the balls properly.

What is claimed is:

1. A ball screw device of a screw axis with a helical groove on its outer circumference for balls to circulate thereon, a nut with a helical groove on its inner circumference for balls to circulate thereon, a number of balls to circulate in an orbit along the helical groove of the screw axis and the opposing helical groove of the nut, and a tunnel raceway for the balls to circulate unlimitedly, comprising a through-hole formed within a wall of the nut for the balls to circulate from one end of the helical groove of the nut to the other end, with the through-hole having a guidepath on either end of the helical groove of the nut to feed the balls into the tunnel raceway, and wherein each axial end face of the nut has a helical cut-out groove, each helical cut-out groove connected to the guide path, a part of the helical groove of the nut being cut in a direction at a right angle to the screw axis due to the helical cut-out groove, the helical cut-out grooves and the helical groove of the screw axis preventing the balls from falling out from the nut cooperatively, the balls being supported by the helical groove of the screw axis and the helical cut-out groove of the nut, the helical groove of the screw axis having a first edge and the helical cut-out groove having a second edge, a distance between the first edge and second edge being less than a diameter of the balls to prevent the balls from falling out.

2. A ball screw device having the tunnel raceway of claim 1, comprising a structure in which the through-hole and helical cut-out groove are connected through an opening of a land portion or a projection of an angled structure being provided on the guidepath of the tunnel raceway.

\* \* \* \* \*